United States Patent
Papic et al.

(10) Patent No.: US 10,408,264 B2
(45) Date of Patent: Sep. 10, 2019

(54) BEARING ARRANGEMENT

(71) Applicant: Ford Global Technologies, LLC, Dearborn, MI (US)

(72) Inventors: Ivica Papic, Nordrhein Westfalen (DE); Hubertus von Chappuis, Bedburg (DE); Xiaodan Markowitz, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/886,771

(22) Filed: Feb. 1, 2018

(65) Prior Publication Data
US 2018/0216666 A1    Aug. 2, 2018

(30) Foreign Application Priority Data
Feb. 2, 2017 (DE) .................. 10 2017 201 646

(51) Int. Cl.
| | |
|---|---|
| *F16C 9/04* | (2006.01) |
| *F16C 33/04* | (2006.01) |
| *F16C 17/12* | (2006.01) |
| *F16C 27/06* | (2006.01) |
| *F16B 4/00* | (2006.01) |

(Continued)

(52) U.S. Cl.
CPC .............. *F16C 33/04* (2013.01); *F16B 4/004* (2013.01); *F16C 9/04* (2013.01); *F16C 11/08* (2013.01); *F16C 17/12* (2013.01); *F16C 23/04* (2013.01); *F16C 27/063* (2013.01); *F16C 33/14* (2013.01); *F16C 35/06* (2013.01); *F16B 2200/406* (2018.08); *F16B 2200/509* (2018.08);

(Continued)

(58) Field of Classification Search
CPC .......... F16C 9/04; F16C 11/03; F16C 11/024; F16C 11/08; F16C 27/063; F16C 33/04; F16C 35/06; F16F 1/3835; F16F 1/3732; F16F 1/387; F16B 4/004; F16B 2200/406; F16B 2200/509
USPC ...... 384/215, 276, 297; 248/635; 267/141.3, 267/141.4, 153, 293; 411/34, 65, 111; 403/110, 256, 228
See application file for complete search history.

(56) References Cited

U.S. PATENT DOCUMENTS 2,300,237 A * 10/1942 Schroeter ........... B60G 21/0551
                                                                267/188
2,513,193 A *  6/1950 Miller .................... A47B 91/04
                                                                 16/38

(Continued)

FOREIGN PATENT DOCUMENTS

| DE | 19757870 A1 | 12/1997 |
|---|---|---|
| DE | 19832417 A1 | 1/2002 |
| DE | 102011089259 A1 | 6/2013 |

*Primary Examiner* — Marcus Charles
(74) *Attorney, Agent, or Firm* — Raymond L. Coppiellie; Burgess Law Office, PLLC (57) ABSTRACT

A bearing arrangement for connecting two components including a bearing bushing having an inner sleeve and an elastic element surrounding the inner sleeve. Two connection portions are arranged axially on both sides of the inner sleeve wherein a connector having a shaft portion extending through the inner sleeve applies a clamp force compressing the connection portions axially against the inner sleeve. The inner sleeve is deformed by the clamp force of the connector in such a manner that at least one contact portion of the inner sleeve presses radially to the inside and against the shaft portion.

16 Claims, 5 Drawing Sheets

(51) Int. Cl.
*F16C 11/08* (2006.01)
*F16C 35/06* (2006.01)
*F16C 23/04* (2006.01)
*F16C 33/14* (2006.01)
*F16C 33/20* (2006.01)

(52) U.S. Cl.
CPC ........ *F16C 33/208* (2013.01); *F16C 2208/02* (2013.01); *F16C 2326/05* (2013.01)

(56) References Cited

U.S. PATENT DOCUMENTS

| | | | | |
|---|---|---|---|---|
| 2,660,908 A * | 12/1953 | French | ........... | B62D 7/16 |
| | | | | 280/93.508 |
| 3,026,124 A * | 3/1962 | Eyb | ........... | B60G 3/20 |
| | | | | 280/124.135 |
| 3,679,158 A * | 7/1972 | Pusch | ........... | F16F 1/3732 |
| | | | | 267/141.3 |
| 4,158,511 A * | 6/1979 | Herbenar | ........... | F16C 11/08 |
| | | | | 384/297 |
| 4,316,643 A | 2/1982 | Burk et al. | | |
| 4,632,591 A * | 12/1986 | Fullenkamp | ........... | A61G 12/00 |
| | | | | 403/227 |
| 4,817,984 A | 4/1989 | Ferman et al. | | |
| 4,860,485 A * | 8/1989 | Rhoton | ........... | A01K 87/00 |
| | | | | 43/24 |
| 5,601,304 A | 2/1997 | Tilly et al. | | |
| 5,881,980 A * | 3/1999 | Knudson | ........... | A47B 9/00 |
| | | | | 108/147.19 |
| 6,572,088 B2 * | 6/2003 | Tadano | ........... | F16F 1/3863 |
| | | | | 267/141.3 |
| 7,306,211 B2 * | 12/2007 | Bjorkgard | ........... | B60G 7/005 |
| | | | | 267/141 |
| 7,416,200 B2 | 8/2008 | Hass et al. | | |
| 8,061,693 B2 | 11/2011 | Neureder | | |
| 9,016,992 B2 * | 4/2015 | Alvarado, Jr. | ........... | F16B 4/004 |
| | | | | 411/34 |
| 2005/0200064 A1 * | 9/2005 | Klein | ........... | F16F 1/3814 |
| | | | | 267/293 |
| 2012/0248666 A1 * | 10/2012 | DeBruler | ........... | B60G 15/12 |
| | | | | 267/64.24 |
| 2014/0029886 A1 * | 1/2014 | Hofmann | ........... | F16C 33/60 |
| | | | | 384/569 |

* cited by examiner

BEARING ARRANGEMENT

CROSS-REFERENCE TO RELATED APPLICATIONS

Not Applicable.

BACKGROUND OF THE INVENTION

1. Field of the Invention

The invention relates to a bearing arrangement; and more specifically to an arrangement having an inner sleeve with a contact portion.

2. Description of Related Art

Elastic bearings in motor vehicle wheel suspensions connect parts movable relative to one another. Such elastic bearings may include rubber/metal composite bearings. A rubber/metal bushing has a metallic inner sleeve surrounded concentrically by a rubber-elastic element and normally includes a metallic outer sleeve. The inner sleeve is connected to a suspension part while the outer sleeve, or the rubber-elastic element, connects to a different suspension part. The elasticity of the rubber-elastic element allows movement between the two suspension parts to a limited extent. Defining an axial direction by the profile of the inner sleeve, axial, radial, tangential and unchanged movements are thus conceivable. The bearing acting, a limited extent, in a similar manner to a ball joint. Besides the fact that various degrees of freedom are created by the elasticity, the rubber-elastic element also prevents the transmission of vibrations that are undesirable in terms of NVH aspects.

One example of a use for such bearings is a transverse control arm, where a connection to a wheel carrier or a vehicle structure is often carried out via rubber/metal bearings. In one example of such a connection, the bushing is pressed, with the outer sleeve, into a recess in the control arm, while a vehicle-side axle extends through the inner sleeve. The axle can be formed by a bolt, screw, threaded member or other fastening mechanism extending through openings in portions lying axially opposite one another of the vehicle structure. The head of the bolt or screw bears against one portion, while a nut screwed onto the threads bears against the other portion. The inner sleeve positioned between the portions is compressed by the axial tensioning force generated by the combination of the bolt and nut, which generates a clamp force against the inner sleeve.

The dimensions of the inner sleeve and the bolt are matched to one another so at least some small radial spacing exists facilitating insertion of the bolt into the inner sleeve during assembly. Because of the radial spacing, there is no positive fit or frictional connection between the bolt and the inner sleeve. Transverse forces acting on the side of the control arm are transmitted from the rubber-elastic element to the inner sleeve and in a frictionally engaged manner directly to the respective portions of the vehicle structure, i.e., the flow of force does not run through the bolt, rather only in the frictional engagement at the end faces of the inner sleeve. Bearing forces acting transverse to the axial direction are exclusively transmitted via a contact surface between the inner sleeve and the respective portion of the vehicle structure which acts as a shear surface. A contact surface between the bolt and the vehicle structure or an intermediate element such as a washer does not contribute to the transmission of force.

SUMMARY OF THE INVENTION

A bearing arrangement including a bearing bushing having an inner sleeve and an elastic element surrounding the inner sleeve. The inner sleeve having a contact portion formed in an end region of the inner sleeve. A connector having a shaft portion extends through the inner sleeve wherein a clamp force of the connector presses the contact portion of the inner sleeve against the shaft portion.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

In the different figures, identical parts are always provided with the same reference numbers, and are generally only described once.

Figure 1:
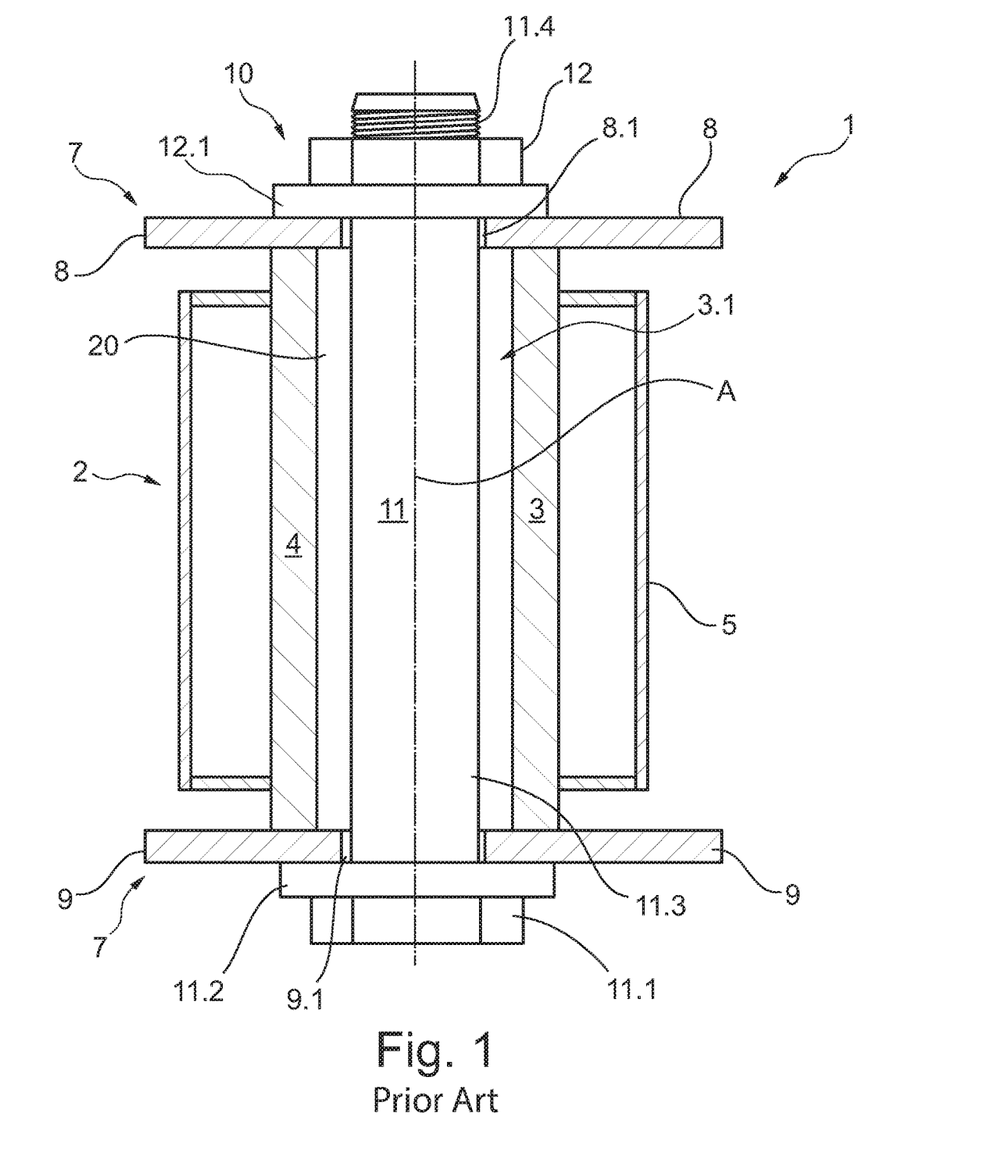
FIG. 1 is a bearing arrangement for a wheel suspension according to the prior art.

FIG. 1 shows a prior art bearing arrangement 1 connecting two suspension parts 6, 7 movably to one another. A bearing bushing, seen generally at 2, formed in a familiar manner as a rubber/metal bushing may be regarded as an element of bearing arrangement 1. A cylindrical inner sleeve 3, formed of metal, is surrounded concentrically by an elastic element 4, which in turn, is surrounded on the outside by an outer sleeve 5, also formed of metal. Each of stated elements 3, 4, 5 are cylindrically formed, in the manner of a cylinder barrel, and run or extend symmetrically to an axis of symmetry A that defines an axial direction. The outer sleeve 5 is pressed into an opening on a first suspension part 6, for example, a suspension control arm. Bearing bushing 2 is inserted between two connection portions 8, 9 of a second suspension part 7, for example, of an auxiliary frame, such that an inner recess, opening or passageway 3.1 is flush or aligned with two continuous recesses, openings or apertures 8.1, 9.1 of connection portions 8, 9.

A connector 10, for example, a bolt, screw or threaded fastener creates a preload, which is the tension created in the fastener when tightened. The tensile force in the fastener creates a compressive force in the joint known as a clamp force. For example, with a bolt and nut combination, tightening the nut on the bolt compresses the two parts together. While the bolt itself is in tension, it has a reaction or compression force. Accordingly, the force generated by the connector 10 acting on the inner sleeve 3 and/or connection portions 8,9 is referred to as a compressive force.

A connector 10, or tensioning device, shown herein in one embodiment as bolt 11 extends through three openings 3.1, 8.1, 9.1 so its head 11.1 bears with a flange 11.2 against the second connection portion 9. On the opposite side, a nut 12 threadably engages a threaded shaft portion 11.4 of screw 11 so a flange 12.1 of the nut 12 bears against the first connection portion 8. A shaft portion 11.3 extends in a contact-free manner through the recess 3.1 wherein a space 20 exists between the shaft portion 11.3 and the inner sleeve 3. Both connection portions 8, 9 deflect, at least slightly, either elastically and/or inelastically, whereby they are compressed inwardly in the axial direction against inner sleeve 3. In the disclosed embodiment, bolt 11 and nut 12 can be parts of the connector 10 used to secure bearing arrangement to the suspension part 7. The foregoing results in a non-positive connection between first connection portion 8 and inner sleeve 3 and the second connection portion 9 and inner sleeve 3. Forces acting between both suspension parts 6, 7 transverse to the axial direction are transmitted from outer sleeve 5 via elastic element 4 to inner sleeve 3 and from the inner sleeve 3 through the described non-positive connection, to both connection portions 8, 9. Connector 10 enables force transmission because it compresses both connection portions 8, 9 in the described manner against inner sleeve 3, but it does not participate in their transmission as a shear surface is formed between inner sleeve 3 and respective connection portion 8, 9, but not between head 11.1 of the bolt 11 or nut 12 and respective connection portion 8, 9.

Figure 2:
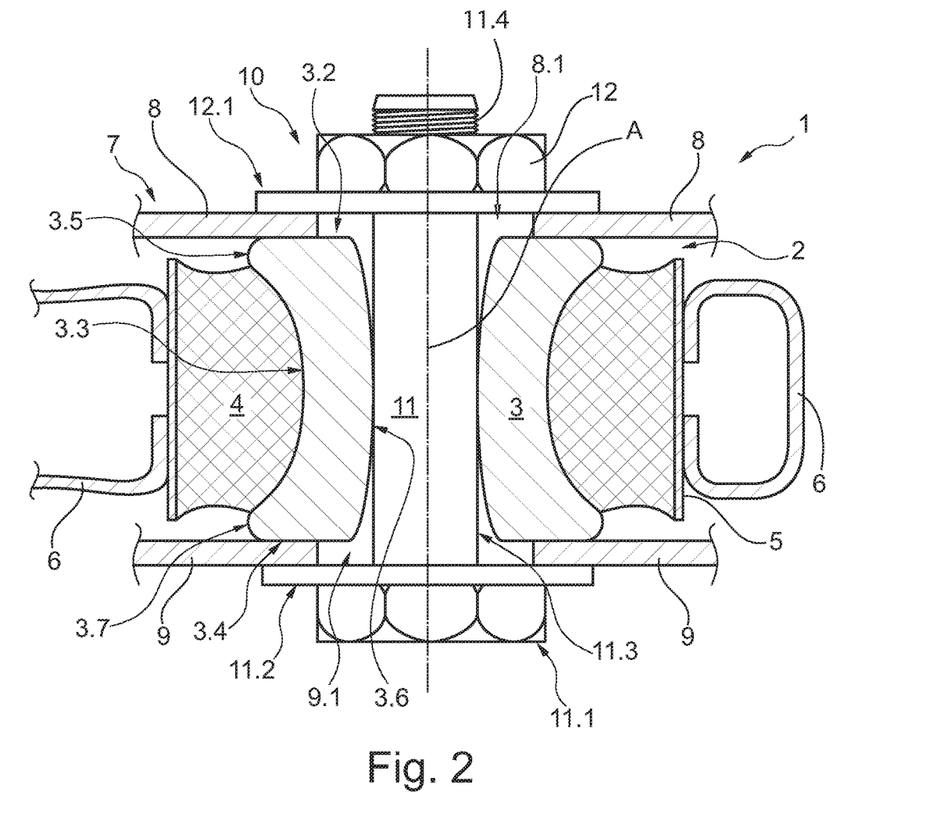
FIG. 2 is a partial sectional representation of a first embodiment of a bearing arrangement according to a first embodiment of the invention.

FIG. 2 illustrates a bearing arrangement 1 according to a first embodiment of the present invention. Bearing arrangement 1 has substantially the same elements as the bearing arrangement 1 in FIG. 1 and is not described again in detail. As shown in FIG. 2 the inner sleeve 3 includes collars 3.5, 3.7, circumferential in a tangential direction, and extending outwards, formed at both end regions 3.2, 3.4 of inner sleeve 3. The axial forces generated by the connector 10 act via connection portions 8, 9 on the collars 3.5, 3.7 generating bending moments that deflect the inner sleeve 3 radially outwards in end regions 3.2, 3.4 and radially inwards in an intermediate central region 3.3 thereof. As illustrated, the intermediate central region has a tapered, i.e., quasi-constricted form. As shown, the compressive force generated by the connector 10 pushes the inner sleeve 3 against the shaft portion 11.3 at a contact portion 3.6 located in central region 3.3 achieving a form fit transverse to the axial direction in this region wherein forces can be transmitted between the inner sleeve 3 and shaft portion 11.3. In turn, such forces can thus be transmitted from bearing bushing 2 to flanges 11.2, 12.1 which are in turn non-positively connected to connection portion 8, 9; i.e., additional shear surfaces are formed at this point. The direct transmission of force from inner sleeve 3 to respective connection portions 8, 9 is naturally also provided. The flow of force is therefore generally carried out on two separate paths and the transmission of force at each of connection portions 8, 9 is carried out via two shear surfaces which are opposite one another in the axial direction.

Figure 3:
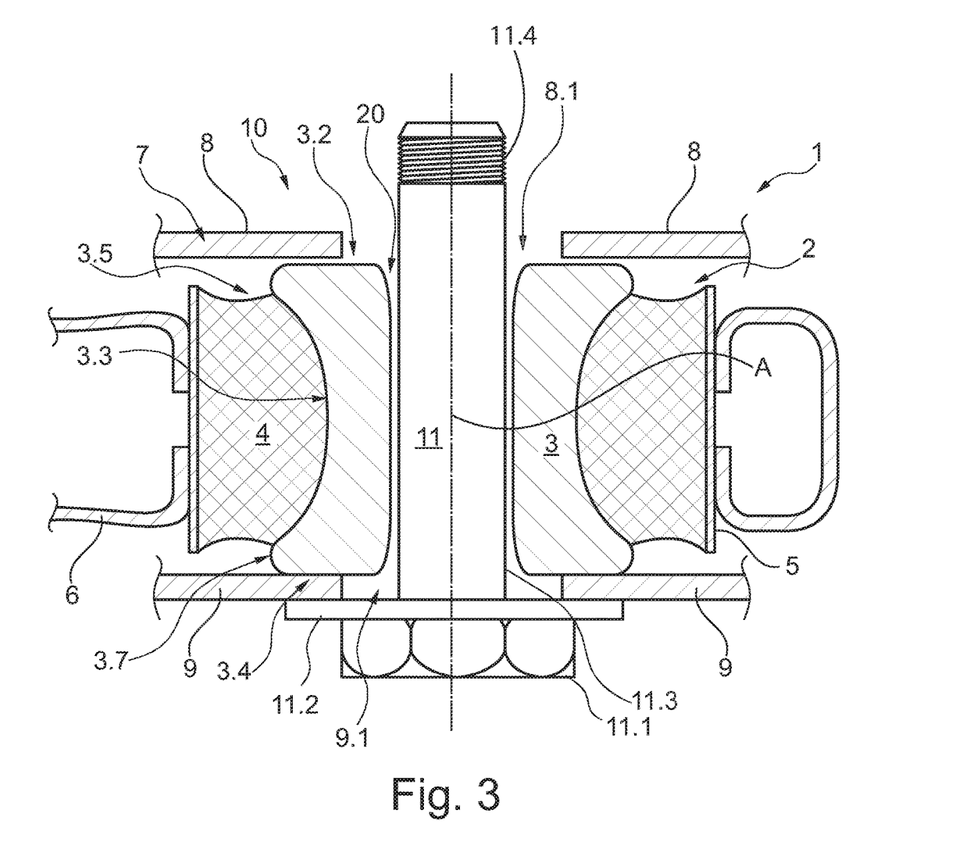
FIG. 3 is a partially assembled sectional representation of parts of the bearing arrangement of FIG. 2.

FIG. 3 shows part of bearing arrangement 1 of FIG. 2 during assembly, before the nut 12 is screwed on. The axial spacing of both connection portions 8, 9 is slightly larger than in FIG. 2 and no deformation of inner sleeve 3 has yet taken place. For this reason, central portion 3.3 is still spaced apart from shaft portion 11.3 and the spacing or space 20 exists. Placing and tightening the nut 12 on the threaded portion 11.4 of the shaft portion 11.3 moves the connection portions 8, 9 axially towards one another so they bear against inner sleeve 3, to be more precise against the collars 3.5, 3.7, which are subsequently axially compressed and bring about the deformation described above of inner sleeve 3. FIGS. 2 and 3 are only to be understood schematically, both the spacings of components and their deformation are not represented to scale.

Figure 4:
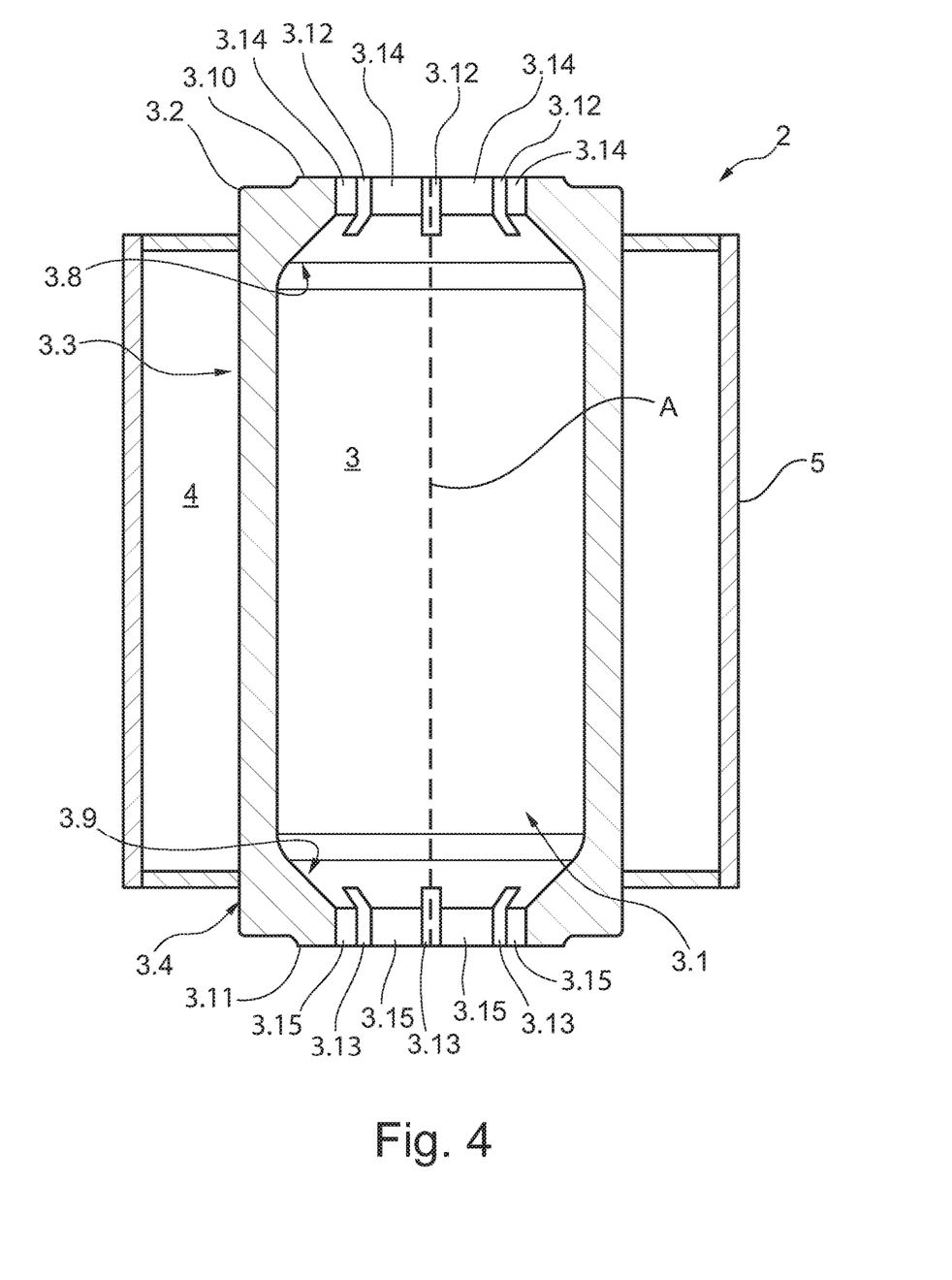
FIG. 4 is a sectional representation of a bearing bushing for a second embodiment of a bearing arrangement according to the invention.
Figure 5:
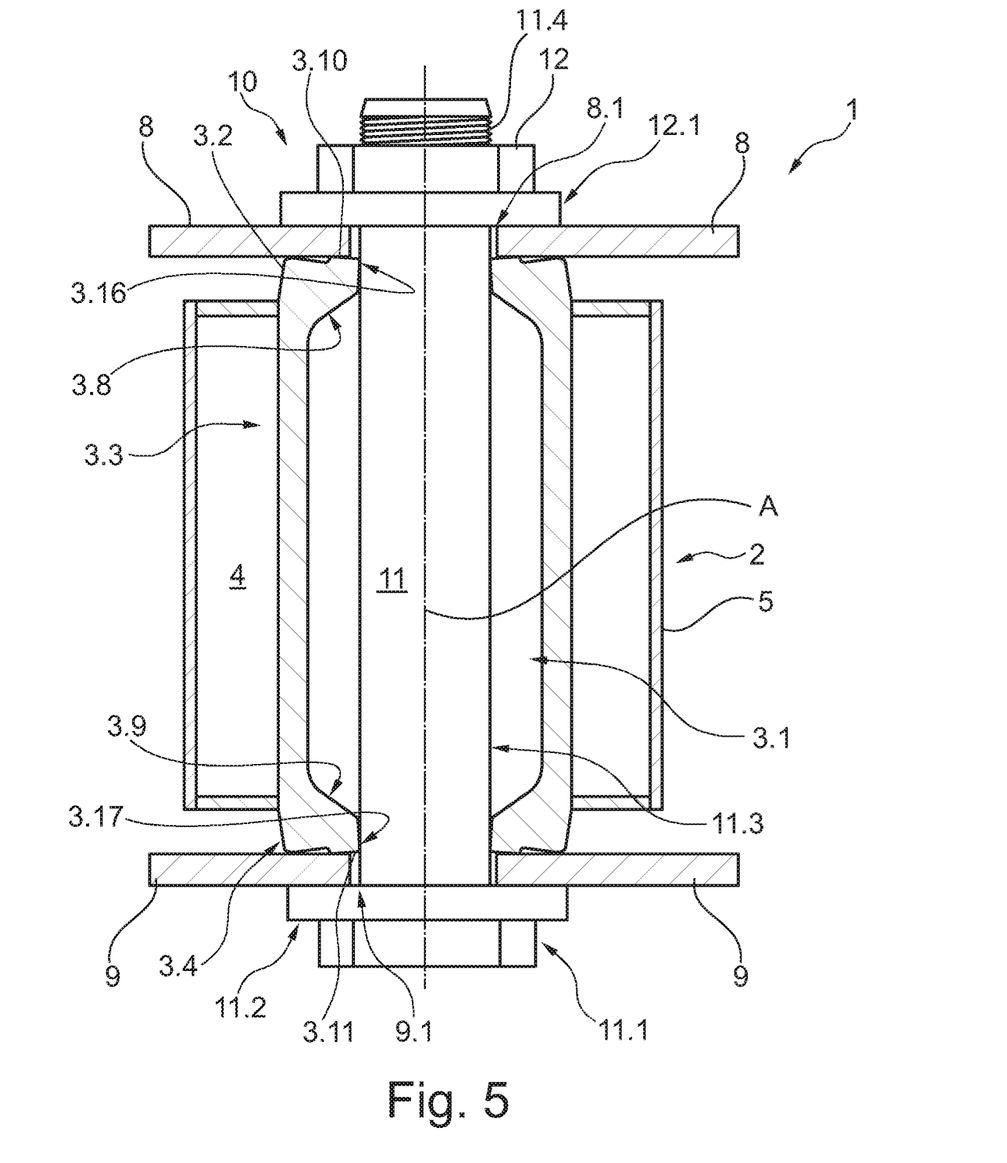
FIG. 5 is an assembled partial sectional representation of the second embodiment of a bearing arrangement of FIG. 4.

FIG. 4 shows a sectional representation of an alternative bearing bushing 2 for a second embodiment of a bearing arrangement 1 also shown in FIG. 5. Bearing bushing 2 is represented in a non-deformed state in FIG. 4. The inner sleeve 3 may be formed of metal that is in turn surrounded concentrically by an elastic element 4, for example, rubber, which is in turn surrounded by a cylinder barrel-shaped outer sleeve 5 that may be formed of metal. As shown the inner sleeve 3 may include radially inwardly directed collars 3.8, 3.9 are formed in end regions 3.2, 3.4 of inner sleeve 3. In each case axial projections 3.10, 3.11 are formed at the end side and extend axially outward from the end regions 3.2, 3.4. Further, the axial projections are located radially on the inside of the collars 3.8, 3.9 and adjacent the recess 3.1 and do not extend to an outer circumferential surface of the sleeve 3. A series of axially running slots 3.12, 3.13, formed in each case radially continuously, are furthermore incorporated into each respective collar 3.8, 3.9. A series of web portions 3.14, 3.15, of which two are separated by a slot 3.12, 3.13, are formed by slots 3.12, 3.13.

FIG. 5 shows bearing bushing 4 installed within bearing arrangement 1. The fundamental structure corresponds substantially to the first embodiment of the invention. However, the axial force exerted by connector 10 and transmitted by connection portions 8, 9 brings about a different type of deformation of inner sleeve 3. Since at least initially only projections 3.10, 3.11 are in contact with respective connection portions 8, 9, initially a compressive force applied by the connector 10 acts only at the axial projections 3.10, 3.11. Continued application of a compressive force causes a type of lever action exerting an amplified bending moment on respective collars 3.8, 3.9. The corresponding bending moment bends, as shown in FIG. 5, the collars 3.8, 3.9 radially inward wherein the collars 3.8, 3.9 press against the shaft portion 11.3 at contact portions 3.16, 3.17. Because of the inwardly directed movement, less space is available to respective collar 3.8, 3.9 in the tangential direction, to a certain extent equivalent to tangential compression. To reduce this, the slots 3.12, 3.13 provide space for and allow tangential compression of the web portions 3.14, 3.15 between the slots 3.12, 3.13 to move closer together in the tangential direction.

Different features of the second embodiment represented in FIGS. 4 and 5 can also be combined in a modified form with the first embodiment shown in FIGS. 2 and 3. An axial projection can also be provided on the outside or adjacent the outer circumference of the outwardly directed collar 3.5, 3.7. It would also be possible to provide a series of slots in central portion 3.3, which slots facilitate the inwardly directed movement of the corresponding region.

As disclosed, the exemplary embodiment is a bearing arrangement 1 for connecting two components, for example, suspension parts 7, 8. The bearing arrangement 1 connects components mounted to one another, wherein different degrees of freedom enable an axial, tangential, radial and/or unchanged movement, as is also explained below. In particular, a bearing arrangement 1 for a vehicle suspension, wherein the components are suspension parts. Possible vehicles are in particular motor vehicles such as HGVs or cars, but also, for example, trailers of any type. The suspension including all the parts that connect at least one vehicle wheel to a vehicle structure, including chassis, body, and/or auxiliary frame. At least one of these parts can also be part of the vehicle structure itself.

The bearing arrangement 1 has a bearing bushing 2 which in turn has an inner sleeve 3 and an elastic element 4 surrounding it for at least indirect connection to a first component. The inner sleeve 3 forms the inner part of the bearing bushing 2 and extends in an axial direction. The inner sleeve 3 includes a continuous internal recess or through-bore 3.1 of the bearing bushing 2. The inner sleeve 3 is preferably composed of metal, for example, steel, but other materials such as, for example, fiber-reinforced plastic are also conceivable. It can be formed at least partially symmetrically in relation to an axially running axis of symmetry. It is normally formed in one piece.

The inner sleeve 3 is surrounded radially on the outside by the elastic element 4, which is arranged concentrically around the inner sleeve 3. The elastic element can preferably be formed at least symmetrically to the above-mentioned axial axis of symmetry, but an asymmetrical, for example, eccentric configuration would also be conceivable. The elastic element 4 can also be referred to as a rubber or rubber-elastic element and does not necessarily have to be rubber, rather it can also be formed from an elastic material with comparable properties, e.g., silicon or polyurethane. The elastic element 4 is normally formed in one piece, but a multi-part formation is also conceivable, or a multiplicity of elastic elements can be present. The elastic element 4 bears at least in portions against the inner sleeve 3 and can form with it a positive fit, and where applicable, an adhesive bond exists between the elastic element 4 and inner sleeve 3. The elasticity of the element is significantly higher than that of the inner sleeve 3 so forces acting on the elastic element 4 primarily bring about a deformation thereof but in any event a negligible deformation of the inner sleeve 3. The elastic element 4 serves the purpose of at least indirect connection to a first component, i.e., it can, for example, be pressed, glued directly into a recess of the first component or otherwise connected thereto.

Alternatively, the elastic element 4 can itself be surrounded by an outer sleeve 5 which, like the inner sleeve 3, tends to be inelastic and can also be composed, for example, of metal or plastic. The outer sleeve 5 can be arranged in an opening of the first component or suspension part 6, for example, by pressing it in. In any event, a restricted movability of the first component 6 with respect to the inner sleeve 3 is ensured by the elasticity of the elastic element 4. In particular, an axial, radial, tangential and unchanged movement can be possible. The overall structure of the bearing bushing 2 corresponds to a composite bearing, in particular, a rubber/metal bearing. The bearing bushing 2 may also be configured in the manner of a hydro bushing, wherein one or more chambers connected to one another, in which a fluid is enclosed, are provided between the inner sleeve and outer sleeve apart from the elastic element 4. As a result, the damping characteristics can be improved or refined compared to a rubber/metal bushing.

The bearing arrangement has two connection portions 8, 9, arranged axially on both sides of the inner sleeve 3, of a second component or suspension part 7. The two connecting portions 8, 9 are axially separated from one another by the inner sleeve 3 lying between them, but can be parts of a single component, for example, in one piece. They are normally formed from metal, for example, steel, wherein other materials, for example, fiber-reinforced plastics, are also conceivable. They can be formed to be plate-shaped and be, for example, portions of one or more sheet metal parts.

The bearing arrangement 1 furthermore includes a connector 10, for example bolt 11 having a shaft portion 11.3 guided through the recess or throughbore 3.1 of the inner sleeve 3. The connector 10 applies a compressive force on the connection portions 8, 9 axially against the inner sleeve 3 thereby sandwiching the inner sleeve 3 between the connection portions 8, 9. The shaft portion 11.3 of the bolt 11 is, in this case, a part of the connector 10 which is guided through the inner sleeve 3, to be more precise through the axially continuous recess 3.1. In one embodiment, the shaft portion 11.3 of the bolt of the connector 10 has a longitudinally extending cylindrical shape. The shaft portion 11.3 is normally formed in one piece. The connector 10, that is the bolt 11 and nut 12 combination, compresses the connection portions 8, 9 axially against the inner sleeve 3, i.e., a force acting in the axial direction on the connection portions 8, 9 in the direction of the inner sleeve 3. The connection portions 8, 9 bear against the inner sleeve 3 with an axial exertion of force. The shaft portion 11.3 of the bolt 11 transmits force in the axial direction. To apply or withstand these forces, the connector 10 can be composed at least partially from metal, for example, steel or titanium. As shown, at least one connection portion 8, 9, and in particular both, can have an opening or throughbore through which the connector 10 is guided. The corresponding opening more or less flush with the continuous recess 3.1 of the inner sleeve 3. In particular, the shaft portion 11.3 can be guided through the respective opening.

The inner sleeve 3 is deformed by a compressive force exerted by the connector 10 so at least one contact portion 3.6, 3.16, 3.17 of the inner sleeve 3 is pushed radially inwards against the shaft portion 11.3, i.e., the connector 10 exerts a compressive force bringing about a deformation of the inner sleeve 3. In an exemplary embodiment, the inner sleeve 3 may have a predetermined or special shape so the desired deformation takes place. This deformation being such that at least one contact portion 3.6, 3.16, 3.17 of the inner sleeve 3 is pushed radially inwards so it bears against the shaft portion 11.3 or comes into contact therewith. The deformation is preferably at least primarily elastic, which can be effectively realized, for example, with an inner sleeve composed of steel. The contact portion arranged against the shaft portion wherein elastic deformation of the inner sleeve 3 results in a compressive force that pushes the contact portion against the shaft portion. The portion in which contact arises is referred to here as the contact portion. This can also involve a multiplicity of contact portions, in particular, two. A contact portion can preferably be formed to be circumferential, in the tangential direction, i.e., it can surround the shaft portion 11.3. It is, nevertheless, also possible that the contact portion 3.6, 3.16, 3.17 has individual discontinuities in the tangential direction.

Without the action of the connector 10, the inner sleeve 3 is preferably dimensioned so the shaft portion 11.3 can be arranged spaced apart, i.e., in this state there is a space between the shaft portion 11.3 and the inner sleeve 3. Because of the action of the connector 10, the respective contact portion 3.6, 3.16, 3.17 is deflected radially inwards so there is no longer any space in this region. A partial form fit between inner sleeve 3 and shaft portion 11.3 is produced. Because the connector 10, to which the shaft portion 11.3 belongs, is in contact with both connection portions 8, 9, a transmission of force from the connection portions 8, 9 via the connector 10 and the inner sleeve 3 is enabled and from there via the elastic element 4 to the first component or suspension part 6. In particular, an additional shear surface is formed between the connector 10 and the respective connection portion 8, 9. In this manner, the transmission of force within the bearing, in particular in relation to forces acting transverse to the axial direction, is expanded by a further force-transmitting joint, namely that of the connector 10 to the connection portion. As a result, the overall connection becomes more secure without, for example, the bearing bushing 2 having to be larger and heavier. Moreover, parts of the bearing arrangement can be manufactured with greater tolerance, which can then be equalized by the described deflection of the contact portion 3.6, 3.16, 3.17.

The components can be in particular suspension parts, including a first suspension part and second suspension part. In particular, the first suspension part can be a suspension control arm. In principle any known type of control arm, for example, a longitudinal control arm or transverse control arm. The second suspension part can, for example, be an auxiliary frame on which the suspension control arm is arranged or a wheel carrier which is connected to the vehicle structure via normally a multiplicity of control arms.

Embodiments are conceivable in which the connector 10 acts directly on the inner sleeve 3 to bring about its deformation. The transmission of force is preferably carried out via one or both connection portions 8, 9. With such a configuration, at least one connection portion 8, 9 is arranged in a force-transmitting manner between the connector 10 and the inner sleeve 3. The connection portion 8, 9 or at least a part thereof is arranged between the connector 10 and the inner sleeve 3 so it transmits a force between these. Since the transmitted force acts axially, the corresponding parts of the connector 10, of the connection portion 8, 9 and the inner sleeve 3 are normally arranged consecutively in the axial direction. With this configuration, the connector 10 acts upon the respective connection portion 8, 9, which acts upon the inner sleeve 3 causing the above-described deformation.

According to one embodiment, the connector 10 includes a bolt, screw or other threaded member 11 having a shaft portion 11.3 and a head 11.1 acting at least indirectly on a connection portion 8, 9, and a nut 12 engaging threads 11.4 and acting at least indirectly on the other connection portion 8, 9. During assembly of the bearing arrangement 1, the inner sleeve 3 is initially arranged between the two connection portions 8, 9 and subsequently the bolt 11 is guided through the connection portions 8, 9 and through the inner sleeve 3. The head 11.1 of the bolt 11 bears, where applicable with a washer or the like, against a connection portion 8. In the region of the other connection portion 9, the nut 12 threadably engages the threaded portion or threads 11.4 of the shaft 11.3 and is rotated, a washer or the like can be used, until it bears against the other connection portion 9. Tightening the nut 12 and bolt 11 generates a compressive force between the head 11.1 and nut 12 that brings about the deformation described above of the inner sleeve 3.

The radially inwardly directed movement of the contact portion 3.6, 3.16, 3.17 normally involves a reduction in the circumference of the sleeve 3. Since typical materials of the inner sleeve 3 such as steel are only compressible to a limited extent, it is expedient to support the deformation by a suitable shaping of the contact portion. According to one preferred configuration, a multiplicity of axially extended recesses or slots 3.12, 3.13 are formed in at least one contact portion. These recesses 3.12, 3.13, configured in particular as slots, are entirely or partially compressed during the deformation of the inner sleeve 3, enabling a reduction in the circumference. The recesses can, in particular, be radially continuous. The contact portion may be formed to be non-continuous. Web portions can be formed between the recesses.

According to one embodiment, the contact portion 3.6 is arranged in a central region 3.3 of the inner sleeve 3. The central region 3.3 need not be arranged axially precisely centrally but rather can be offset with respect thereto. This does not involve any of the end regions 3.2, 3.4. The configuration which the inner sleeve 3 assumes because of deformation can be referred to as "tapered," wherein the end regions 3.2, 3.4 remain spaced from the shaft portion 11.3 and the initial spacing may increase because of the deformation. The deformation results in an inward movement in the central region 3.3 forming a type of taper or constriction.

The inner sleeve 3 includes a collar 3.5, 3.7 directed radially outwards and acted upon by the connector 10 formed on at least one end region of the inner sleeve 3. FIGS. 2-3 showing the collar 3.5, 3.7 formed tangentially fully circumferential, alternatively, the collar 3.5, 3.7 can be discontinuous in the tangential direction, or there can be a multiplicity of tangentially spaced apart collar portions. A force acting axially on the collar 3.5, 3.7 leads to a generation of a bending moment that pushes the inner sleeve 3 radially outwards at the corresponding end region and correspondingly pushing the inner sleeve 3 radially inwards in a central portion 3.3 producing contact with the shaft portion 11.3. The collar representing a type of lever supporting the desired deformation. Collars 3.5, 3.7 are preferably formed at both end regions of the inner sleeve.

In an additional or alternative embodiment at least one contact portion 3.16, 3.17 is formed in an end region 3.2, 3.4 of the inner sleeve 3 wherein the respective end region 3.2, 3.4 is pushed radially inwards and forms the contact portion 3.16, 3.17. The term "end region" does not exclusively refer to the axially outermost position, rather, for example, it may include the end-side third or end-side quarter of the inner sleeve 3. It is possible that the contact portion 3.16, 3.17 is formed in the end-side quarter, but the axially outermost part, the outermost 5% of the inner sleeve 3, is not in contact with the shaft portion 11.3. In this configuration, the axially extending recesses can be formed, for example, as end-side slots. A contact portion 3.16, 3.17 may be formed in both end regions of the inner sleeve 3. In a central region lying between the end regions, the spacing or distance between the inner sleeve 3 and the shaft portion 11.3 can remain the same or also possibly increase slightly during deformation.

To support the corresponding deformation, a radially inwardly directed collar 3.8, 3.9 formed in an end region 3.2, 3.4 having a contact portion. The collar acted upon directly or indirectly by an axial force generating a bending moment leading to an inwardly directed deformation of the end region 3.2, 3.4 resulting in engagement of the contact portion 3.16, 3.17 with the shaft portion 11.3 of the bolt 11. The collar may also be regarded as a lever. The respective collar is formed tangentially fully circumferential. Particularly when recesses that extend axially are present. The recesses or slots 3.12, 3.13 interrupt the inner circumferential surface of the collar forming a multiplicity of tangentially spaced apart collar portions or web portions 3.14, 3.15.

To support the action of the respective collar as a lever, an axial projection 3.10, 3.11 against which a connection portion 8, 9 bears is preferably formed at the end side of the collar. The axial projection 3.10, 3.11 positioned or located to form a radially inwardly directed collar or "radially on the inside," wherein the projection is located radially inward, closer to the axis of symmetry A or a radially outwardly directed collar or "radial on the outside," where in the axial projection is located radially outward, further from the axis of symmetry A. The axial projection 3.10, 3.11 can be formed to be an entirely or partially tangentially circumferential or annular portion projecting in the axial direction that forms part of the inner sleeve 3 coming directly into contact with the connection portion 8, 9. An action of force carried out via the connection portion 8, 9 acts on the projection 3.10, 3.11 and on the radially inwardly or outwardly lying part of the collar 3.8, 3.9 causing the desired lever action and amplifying the generated bending moment. Accordingly, the shape and extent of the axial projection 3.10, 3.11 cooperates with the connection portion 8, 9 to control radial inward or outward movement of the collar 3.8, 3.9 and corresponding force applied by the collar 3.8, 3.9 at the contact portion 3.16, 3.17 on the shaft portion 11.3 of the bolt 11.

As already mentioned, the elastic element 4 can be surrounded by an outer sleeve 5 for connection to the second component war suspension part 7. In an exemplary embodiment, the inner sleeve 3 projects axially with respect to the outer sleeve 5, wherein the axial extension of the inner sleeve 3 is greater at one end, normally at both ends, than the axial extension of the outer sleeve 5. Such a configuration is advantageous since, for example, when the connection portions 8, 9 extend outwardly in an approximately radially-tangentially direction, they contact the inner sleeve 3, but not the outer sleeve 5 which should be movable with respect to the second component or suspension part 7. The inner sleeve 3 also projects axially with respect to the elastic element 4.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A bearing arrangement comprising:
a bearing bushing having an inner sleeve and an elastic element surrounding said inner sleeve;
said inner sleeve having an inner recess and a collar formed on at least one end region of said inner sleeve; and
a connector having a shaft portion extending through the inner recess of said inner sleeve and spaced from the inner recess of said inner sleeve wherein a clamp force of the connector acts on said collar and presses a contact portion of said inner sleeve against said shaft portion; and
an axial projection extending from the end region of said inner sleeve, said axial projection closer to the inner recess in said inner sleeve than to an outer surface of said inner sleeve adjacent to an elastic element.

2. The bearing arrangement of claim 1 including a connection portion arranged in a force-transmitting manner between the connector and the inner sleeve.

3. The bearing arrangement of claim 1 including a radially outwardly directed collar formed on at least one end region of the inner sleeve.

4. The bearing arrangement of claim 1 including the contact portion formed in an end region of the inner sleeve.

5. The bearing arrangement of claim 1 including the inner sleeve having first and second end regions and a contact portion formed in both of the first and second end regions of the inner sleeve.

6. The bearing arrangement of claim 1 including a radially inwardly extending collar formed in an end region of said inner sleeve, said collar including said contact portion.

7. The bearing arrangement of claim 1 including an outer sleeve surrounding the elastic element wherein the inner sleeve has an axial length greater than an axial length of the outer sleeve.

8. A bearing arrangement comprising:
a bearing bushing having an inner sleeve and an elastic element surrounding said inner sleeve;
said inner sleeve having a radially outwardly directed collar formed on at least one end region of said inner sleeve;
a connector having a shaft portion extending through said inner sleeve wherein a clamp force of the connector acts on said collar and presses a contact portion of said inner sleeve against said shaft portion; and
an axially extending recess formed in said contact portion.

9. A bearing arrangement comprising:
a bearing bushing having an inner sleeve and an elastic element surrounding said inner sleeve;
said inner sleeve having a radially outwardly directed collar formed on at least one end region of said inner sleeve;
a connector having a shaft portion extending through said inner sleeve wherein a clamp force of the connector acts on said collar and presses a contact portion of said inner sleeve against said shaft portion; and
a radially inwardly extending collar formed in an end region of said inner sleeve, said collar including said contact portion.

10. A bearing arrangement comprising:
a bearing bushing having an inner sleeve and an elastic element surrounding said inner sleeve;
said inner sleeve having a first contact portion formed in a first end region of said inner sleeve and a second contact portion formed in a second end region of said inner sleeve;
a connector having a shaft portion extending through said inner sleeve wherein a clamp force of the connector presses said first and second contact portions of said inner sleeve against said shaft portion;
first and second radially inwardly directed collars, said first and second radially inwardly directed collars formed at respective first and second end regions of the inner sleeve; and
said first radially inwardly directed collar including said first contact portion and second radially inwardly directed collar including said second contact portion.

11. The bearing arrangement of claim 10 including an axial projection formed at an axial end of each of said first and second radially inwardly directed collars.

12. The bearing arrangement of claim 10 including an axially extending recess formed in each of said first and second contact portions.

13. A bearing arrangement comprising:
a bearing bushing having an inner sleeve and an elastic element surrounding said inner sleeve;
a connector having a shaft portion extending through said inner sleeve;
said inner sleeve having an end region and a contact portion formed in the end region of said inner sleeve;
said inner sleeve having a central region, said central region spaced from said shaft portion; and
wherein a clamp force of the connector presses said contact portion of said inner sleeve against said shaft portion while said central region remains spaced from said shaft portion.

14. The bearing arrangement of claim 13 including said inner sleeve having opposing end regions;

said contact portion includes each of the opposed end regions of the inner sleeve having a contact portion; and said clamp force of the connector pressing both of the contact portion of each end region of the inner sleeve against the shaft portion.

15. The bearing arrangement of claim 13 including a radially inwardly extending collar formed in an end region of said inner sleeve, said collar including said contact portion.

16. The bearing arrangement of claim 13 including an axial projection extending from the end region of said inner sleeve, said axial projection spaced from an outer surface of the inner sleeve.

* * * * *